(12) United States Patent
Barbosa et al.

(10) Patent No.: US 7,648,103 B2
(45) Date of Patent: Jan. 19, 2010

(54) AIRCRAFT FUEL TANKS, SYSTEMS AND METHODS FOR INCREASING AN AIRCRAFT'S ON-BOARD FUEL CAPACITY

(75) Inventors: Weber de Brito Barbosa, São José dos Campos (BR); Paulo Henrique Hasmann, São José dos Campos (BR); Regis Assao, São José dos Campos (BR)

(73) Assignee: EMBRAER—Empresa Brasileira de Aeronautica S.A., Sao Jose dos Campos - SP (BR)

( * ) Notice: Subject to any disclaimer, the term of this patent is extended or adjusted under 35 U.S.C. 154(b) by 373 days.

(21) Appl. No.: 11/637,922

(22) Filed: Dec. 13, 2006

(65) Prior Publication Data

US 2009/0050743 A1 Feb. 26, 2009

(51) Int. Cl.
*B64D 37/06* (2006.01)
*B64D 37/00* (2006.01)

(52) U.S. Cl. .............................. 244/135 R; 244/135 C; 220/4.15; 137/587; 137/590

(58) Field of Classification Search ............. 244/135 R, 244/135 C, 135 B, 135 A, 136; 137/590, 137/592, 587, 266, 899.2, 574, 576; 202/4.15, 202/4.14, 562, 563, 564

See application file for complete search history.

(56) References Cited

U.S. PATENT DOCUMENTS

| | | | | |
|---|---|---|---|---|
| 2,178,564 | A | | 11/1939 | Crocker |
| 2,539,663 | A | * | 1/1951 | Hague ........................ 137/266 |
| 2,955,787 | A | | 10/1960 | Ray et al |
| 2,966,921 | A | | 1/1961 | Whiteman |
| 3,383,078 | A | * | 5/1968 | Shohet et al. ........... 244/135 R |
| 3,432,121 | A | * | 3/1969 | Delaney ................. 244/135 A |
| 3,635,182 | A | * | 1/1972 | Paffett ....................... 220/563 |
| 4,784,354 | A | | 11/1988 | Tavano |
| 6,889,940 | B1 | * | 5/2005 | Howe ...................... 244/135 R |
| 7,040,579 | B2 | * | 5/2006 | Howe ...................... 244/135 R |
| 7,051,979 | B2 | * | 5/2006 | Howe ...................... 244/135 R |
| 7,357,149 | B2 | * | 4/2008 | Howe ...................... 244/135 R |
| 7,357,355 | B2 | * | 4/2008 | Howe ...................... 244/135 R |
| 2002/0020705 | A1 | * | 2/2002 | Vorenkamp et al. ......... 220/4.14 |
| 2005/0016601 | A1 | * | 1/2005 | Reiter et al. ................ 137/590 |

(Continued)

*Primary Examiner*—Michael R Mansen
*Assistant Examiner*—Richard R Green
(74) *Attorney, Agent, or Firm*—Nixon & Vanderhye P.C.

(57) ABSTRACT

Aircraft fuel tanks, systems and methods increase an aircraft's fuel capacity. The fuel tanks have a tank body defining an interior space for holding aircraft fuel, and a relief manifold assembly operatively associated to the tank body to prevent an overpressure condition within the interior space of the fuel tank body. The relief manifold assembly preferably includes a buffer vessel defining a buffer chamber in fluid communication with the interior space defined by the fuel tank body. The buffer vessel may advantageously be fixed to the tank body within the interior space thereof. At least one of a fuel vent manifold assembly for venting the interior space of the fuel tank and a fuel refill/transfer manifold assembly for supplying fuel to and withdrawing fuel from the interior space of the fuel tank. At least one control box (e.g., containing valves, pumps and/or sensors) external of the fuel tank may be provided so as to fluid-connect the at least one fluid manifold assembly to the main fuel system of the aircraft. A plurality of aircraft fuel tanks may therefore be positioned adjacent to one another, preferably within the fuselage (e.g., a cargo compartment) of the aircraft so as to be disposed generally along a longitudinal axis of the aircraft.

32 Claims, 11 Drawing Sheets

U.S. PATENT DOCUMENTS

| | | |
|---|---|---|
| 2005/0034781 A1 | 2/2005 | Rodousakis et al. |
| 2005/0072880 A1 * | 4/2005 | Nolan ........................ 244/136 |
| 2005/0166967 A1 * | 8/2005 | Howe ......................... 137/399 |
| 2006/0214060 A1 * | 9/2006 | Howe ...................... 244/135 R |
| 2006/0214061 A1 * | 9/2006 | Howe ...................... 244/135 R |

* cited by examiner

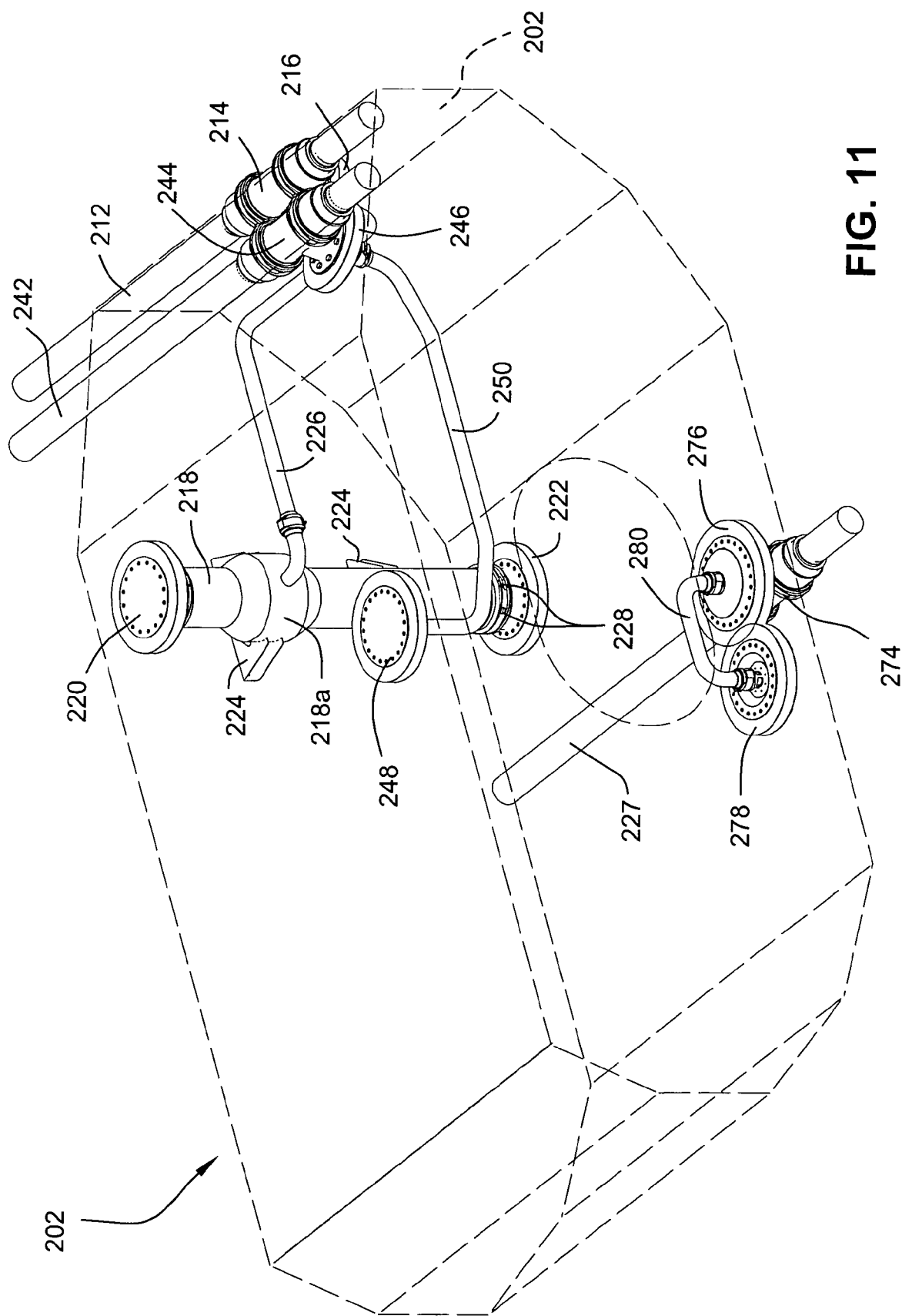

AIRCRAFT FUEL TANKS, SYSTEMS AND METHODS FOR INCREASING AN AIRCRAFT'S ON-BOARD FUEL CAPACITY

FIELD OF THE INVENTION

The present invention relates generally to aircraft tanks, systems and methods which allow for an increase in an aircraft's on-board fuel capacity. In preferred forms, the present invention is embodied in aircraft fuselage fuel tank assemblies, systems and methods for use as a component part of an aircraft's on-board fuel system to provide additional (auxiliary) fuel capacity to the fuel capacity provided by the aircraft's main wing tanks.

BACKGROUND OF THE INVENTION

Commercial and military transport aircraft are typically designed to carry a given load of passengers, cargo or both, at a given range and/or at a given endurance. Occasionally, the range and/or endurance of the aircraft may need to be increased. Such extended range and/or endurance can be accomplished by installing additional or auxiliary fuel tank systems in the aircraft, typically by positioning fuel tanks physically within the aircraft's fuselage cargo space (i.e., that space within the aircraft's pressurized fuselage which is below the passenger deck). Conventional auxiliary fuel tank systems are typically comprised of additional fuel tanks and their respective equipment, manifolds, and harnesses necessary to manage the additional fuel carried in the tanks.

These additional fuel tanks and systems could come in diverse configurations, for example, with tanks installed under the wings, external to the aircraft or with tanks internal to the fuselage. These additional fuel tanks and systems could be configured to directly supply fuel to the engines or to transfer the fuel to other tanks and from there to feed the aircraft engines or be used to control aircraft center of gravity or even to transfer fuel to other aircraft, in flight or to other vehicles, on ground.

Whatever the reasons to install these additional tanks and systems, they should be at most practical to the aircraft operator. Thus, additional tanks and systems which complement an aircraft's main wing tanks should be relatively simple to install, remove, and integrate into the basic aircraft fuel system. In addition, such additional tanks and systems should be relatively simple to maintain.

Auxiliary fuel tank systems are in and of themselves know. For example, it has recently been proposed in U.S. Pat. Nos. 6,889,940, 7,040,579 and 7,051,979 (the entire content of each being expressly incorporated hereinto by reference) to provide auxiliary fuel tank systems that contemplate providing various separate manifold assemblies (e.g., fuel inlet and outlet manifolds, vent manifolds and the like) internally of each tank. By positioning the tanks assemblies in adjacent side-by-side configuration, their respective internal manifolds may be connected together to provide a tank system that can be operatively interconnected with the aircraft's on-board fuel management systems. However, the proposed auxiliary tank systems of these patents may be somewhat sometimes troublesome. For example, the proposed tank systems may require relatively costly precision machining of the respective manifolds as well as relatively expensive assembly of both the tanks and the aircraft. In addition, these proposed conventional auxiliary fuel tanks systems necessarily demand that a high degree of flexibility in the manifold connections be provided so as to assure that the individual fuel tanks (which themselves are of relatively large dimension and heavy weight) are perfectly aligned in a row within an aircraft fuselage in such a way that the manifolds can be properly connected. Potentially therefore, a series of accesses should be provided in such systems so as to ensure that the tanks, manifolds, and their respective connections may be properly inspected against misconnections, leakage and/or damage.

So-called aircraft turn-around time (i.e., the time needed to return a revenue generating aircraft to the flight line after being withdrawn for maintenance purposes) and maintenance costs are of utmost concern to aircraft operators in the aeronautical industry. Thus, although the conventional auxiliary fuel tanks noted previously may be practical for relatively large auxiliary fuel tanks associated with larger aircraft designs, they may be prove to be quite difficult to be embodied in relatively smaller auxiliary fuel tanks associated with smaller aircraft designs due, for example to inadequate access space to install the necessary fuel management equipment by an assembly worker. In addition, these conventional auxiliary fuel tanks may eventually require disassembly and removal of the tanks so as to allow for equipment inspection, repair or replacement, thereby demanding a relatively stiff penalty in both cost and scheduled maintenance down time.

The installation of electrical equipment near or inside such conventional fuel tanks is another subject of concern, when designing fuel system and equipment. The risk of fire, due to contact between fuel or fuel vapors and equipment that potentially causes sparks must be minimized. Thus, for safety reasons, the adoption of "dry bays" is also recommended in auxiliary fuel tank systems so as to provide an installation space for such equipment that is isolated from the fuel and/or fuel vapors. "Dry bays" which are integral to the fuel tanks also make it easier to detect and drain of any leaked fuel even though they may increase tank design and manufacturing costs, add weight and reduce useable fuel quantity. An alternative concept to such "dry bays" includes providing one or more barriers to prevent occasional fuel leakage or diffusion of fuel vapors into the aircraft interior.

Another difficulty that may be encountered in the conventional auxiliary fuel tank systems noted previously relates to the manifolds that interconnect one tank to another so as to transfer fluids in both directions (i.e., into and out of a respective tank). In case of high accelerations or decelerations in a direction generally parallel to the longitudinal axis of the aircraft (and hence the row of auxiliary fuel tanks positioned within the aircraft's fuselage), if the fuel tanks are fluid-connected to one another through one or more manifolds and fuel is allowed to migrate from one fuel tank to another in a cascade fashion, the pressure that responsively develops in the last one of the fuel tanks in that row may reach values well above the tank's structural limits. As a result, a real risk of potentially damaging or even rupturing the fuel tank exists.

It would therefore be highly desirable if aircraft fuel tanks, systems and methods were provided which address at least some (if not all) of the various design concerns and/or considerations noted above with respect to conventional auxiliary fuel tank systems. It is towards fulfilling such a need that the present invention is directed.

SUMMARY OF THE PREFERRED EMBODIMENTS

According to one aspect, an aircraft fuel tank is provided which includes a tank body defining an interior space for holding aircraft fuel, and a relief manifold assembly operatively associated to the tank body to prevent an overpressure condition within the interior space of the fuel tank body. In some embodiments, the relief manifold assembly comprises a buffer vessel defining a buffer chamber in fluid communication with the interior space defined by the fuel tank body. The buffer vessel may advantageously be fixed to the tank body within the interior space thereof.

According to a preferred embodiment, the buffer vessel is positioned within the interior space of the fuel tank body and a relief manifold assembly is provided which comprises a relief conduit external of the fuel tank body. A relief branch conduit thereby fluid-connects the relief conduit to the buffer chamber of the buffer vessel through a wall of the fuel tank body. The buffer vessel preferably includes apertures at a lower end thereof so as to establish fluid communication between the interior space of the fuel tank and the buffer chamber defined by the buffer vessel.

The fuel tanks also most preferably comprise at least one of a fuel vent manifold assembly for venting the interior space of the fuel tank and a fuel refill/transfer manifold assembly for supplying fuel to and withdrawing fuel from the interior space of the fuel tank. In some preferred embodiments, one of the relief manifold assembly, the refill/transfer manifold assembly and the vent manifold assembly is connected to a control box positioned external to the tank body. Thus, in some aspects, each of the relief manifold assembly, the refill/transfer manifold assembly and the vent manifold assembly is connected to a respective control box positioned external to the tank body According to some embodiments, the aircraft fuel tank will include a relief manifold assembly, a fuel refill/transfer manifold assembly and a vent manifold assembly. The refill/transfer manifold assembly will preferably comprise a refill/transfer conduit positioned external to the tank body, a refill/transfer access port on a wall of the tank body to allow access therethrough to the interior spaced defined thereby, an internal recess located on a bottom wall of the tank body within the interior space defined thereby, and a refill/transfer branch line positioned within the interior space of the tank body and establishing fluid communication between the internal recess and the external refill/transfer conduit through the refill/transfer access port. The vent manifold assembly will most preferably comprise a vent conduit positioned external to the tank body, a vent access port on a wall of the tank body to allow access therethrough to the interior spaced defined thereby, an internal recess located on a top wall of the tank body within the interior space defined thereby, and a vent branch line positioned within the interior space of the tank body and establishing fluid communication between the internal recess and the external vent conduit through the vent access port.

In other aspects, aircraft fuel tank systems are provided which are adapted to being mounted within a fuselage section of the aircraft so as to supplement a main fuel system of the aircraft, the fuel tank systems including at least one fuel tank having a tank body which defines an interior space for containing aircraft fuel and which is sized and configured to be positioned within the fuselage section of the aircraft, at least one fluid manifold assembly operably coupled to the at least one fuel tank so as to be in fluid communication with the interior space defined thereby; and at least one control box external of the at least one fuel tank and adapted to fluid-connect the at least one fluid manifold assembly to the main fuel system of the aircraft.

In some embodiments, the at least one fluid manifold assembly comprises a relief manifold assembly operatively associated to the tank body to prevent an overpressure condition within the interior space of the fuel tank body. The control box may therefore comprise a one-way relief valve operably coupled to the relief manifold assembly.

In other additional and/or alternative aspects, the at least one fluid manifold assembly may comprise a fuel vent manifold assembly for venting the interior space of the fuel tank and/or a fuel refill/transfer manifold assembly for supplying fuel to and withdrawing fuel from the interior space of the fuel tank.

According to other embodiments, an aircraft tank system is provided which includes a relief manifold assembly operatively associated to the tank body to prevent an overpressure condition within the interior space of the fuel tank body, a fuel vent manifold assembly for venting the interior space of the fuel tank, and a fuel refill/transfer manifold assembly for supplying fuel to and withdrawing fuel from the interior space of the fuel tank, wherein the at least one control box is operatively connected to at least one of the relief manifold assembly, the fuel vent manifold assembly and the fuel refill/transfer manifold assembly. As briefly noted above, in some embodiments, the at least one control box is operatively connected to the relief manifold assembly and includes a one-way pressure relief valve. One or more other tank-external control boxes may also be provided and connected to the vent manifold assembly and/or the fuel refill/transfer assembly.

A plurality of aircraft fuel tanks may therefore be positioned adjacent to one another, preferably within the fuselage (e.g., a cargo compartment) of the aircraft so as to be disposed generally along a longitudinal axis of the aircraft. In such an embodiment, a forward fuel tank system may be positioned within a forward section of the fuselage compartment, and an aft fuel tank system may be positioned within an aft section of the fuselage compartment. Each of the forward and aft fuel tank systems will most preferably comprise a plurality of the aircraft fuel tanks positioned adjacent to one another and disposed generally along a longitudinal axis of the aircraft.

According to yet another aspect of this invention, methods are provided so as to increase an aircraft's fuel capacity to an aircraft by positioning within the aircraft's fuselage a plurality of the aircraft fuel tanks as briefly described above. More specifically, according to preferred embodiments, such a method will comprise providing a plurality of aircraft fuel tanks each having a tank body which defines an interior space for containing a quantity of aircraft fuel, wherein each of tank bodies includes internal structural components associated with at least one manifold assembly selected from the group consisting of a relief manifold assembly, a vent manifold assembly and a fuel refill/transfer manifold assembly, which internal structural components communicate externally through a wall of the fuel tank body by means of a respective access port, sequentially positioning the aircraft fuel tanks within a fuselage compartment of the aircraft so that the plurality of tank bodies are positioned adjacent to one another along a longitudinal axis of the aircraft; operably connecting the internal structural components of the at least one manifold assembly with external structural components thereof by operably fluid-connecting the internal structural components and external structural components through the respective access port; and operably connecting the external structural component to a respective part of an on-board fuel system of the aircraft to allow the additional fuel capacity provided by the plurality of aircraft fuel tanks to be used an engine of the aircraft. Preferably, the external structural components of the at least one manifold assembly are connected to control box external to the tank body. The tank-external control box may comprise at least one of a pump, a valve, and a sensor. Thus, in some embodiments, the manifold assembly is a relief manifold assembly, and the control box comprises a one-way pressure relief valve.

In practicing a preferred aspect of the method, a first series of the fuel tanks may be positioned in a forward fuselage compartment and a second series of the fuel tanks may be positioned in an aft fuselage compartment of the aircraft.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein;

FIG. 11 is an enlarged perspective view of an exemplary one of tank assemblies forming a component part of the aft fuselage fuel tank system shown in FIG. 7

DETAILED DESCRIPTION OF THE PREFERRED EXEMPLARY EMBODIMENTS

Figure 1:
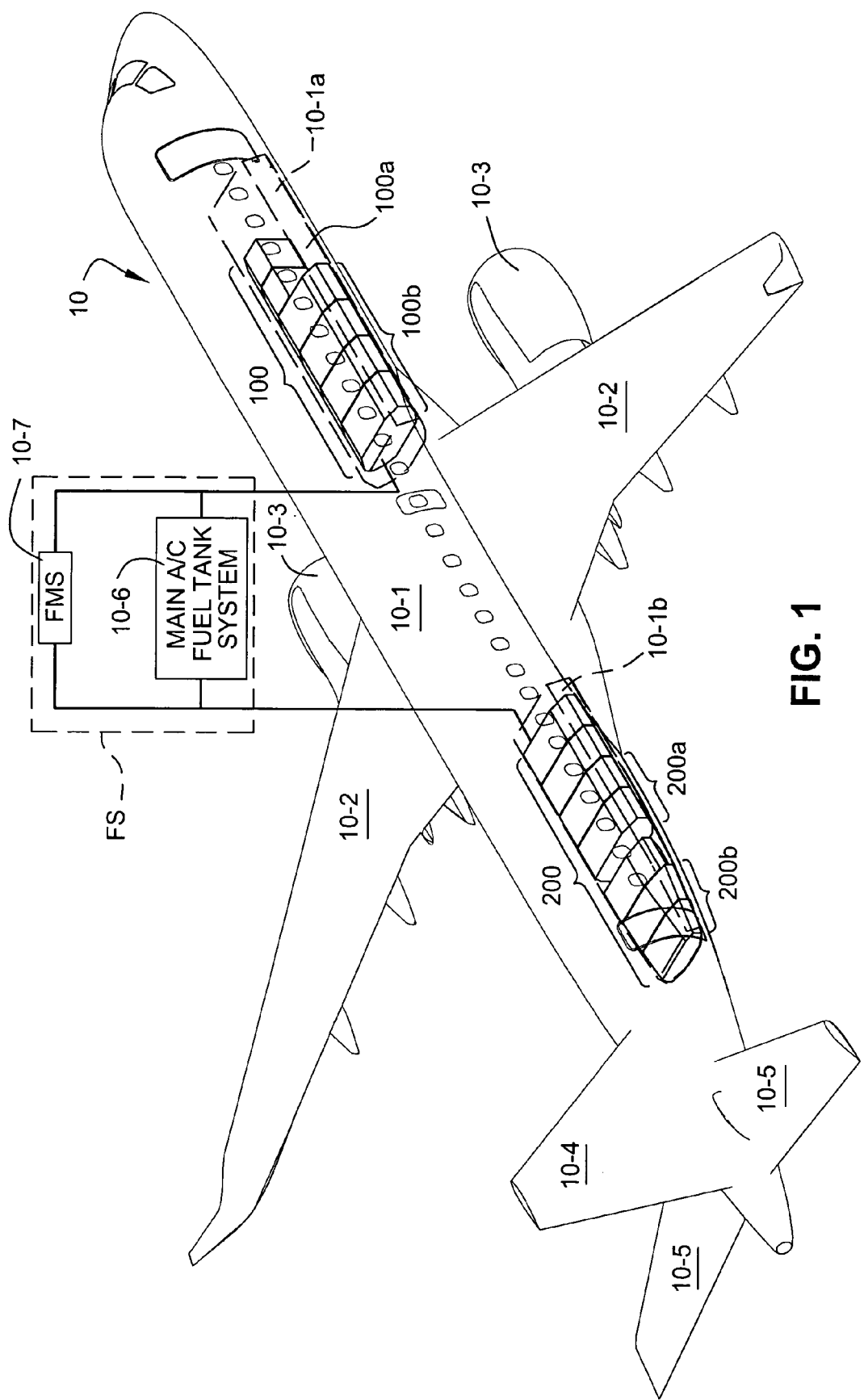
FIG. 1 is a schematic top perspective view of an aircraft with forward and aft fuselage fuel tank systems in accordance with one preferred embodiment of the present invention.
Figure 2:
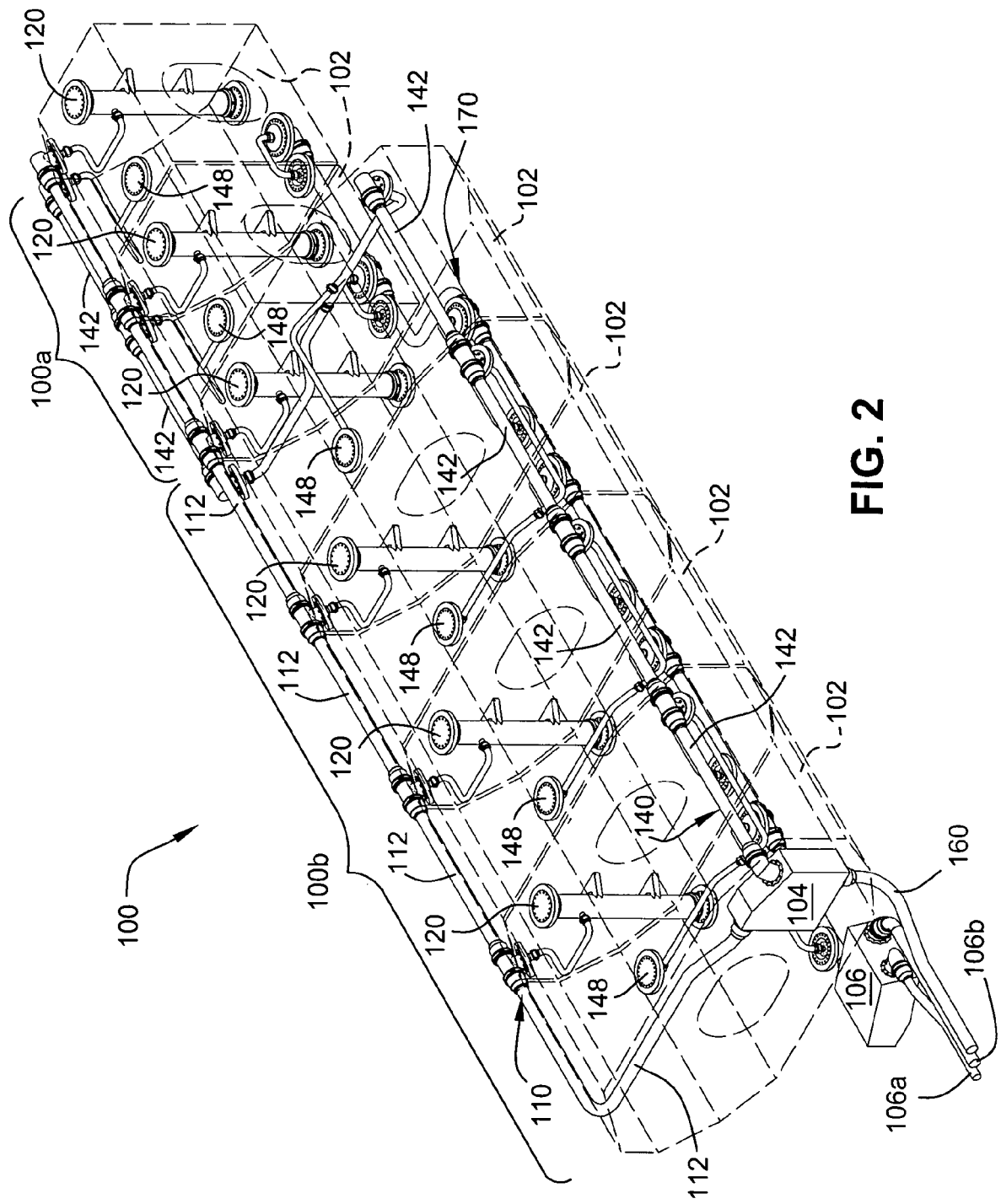
FIG. 2 is a schematic top perspective view of the forward fuselage fuel tank system shown in FIG. 1.

As shown schematically in accompanying FIG. 1, an aircraft 10 has a fuselage 10-1, a pair of wings 10-2 extending generally laterally from the fuselage 10-1 and wing-mounted engines 10-3 to provide the required thrust to the aircraft 10. In this regard, although multiple wing-mounted engines 10-3 are shown, it will of course be understood that the present invention could be utilized satisfactorily with one or more fuselage mounted engines. Stability in the yaw and pitch axes for the aircraft 10 are provided by tail-mounted vertical and horizontal stabilizers 10-4, 10-5, respectively.

As is conventional, the aircraft fuselage 10-1 is provided with forward and aft cargo compartments 10-1a, 10-1b which are accessed respectively by one or more cargo compartment doors (not shown). Respectively positioned within these forward and aft cargo compartments 10-1a, 10-1b are a forward fuel tank system 100 and an aft fuel tank system 200 each having a number of individual tanks 102, 202, respectively. Each of the individual tanks 102, 202 comprising the forward and aft fuel tank systems 100, 200, respectively, are most preferably sized and configured to allow for passage through the forward and aft cargo compartment doors for removable positioning within the forward and aft cargo compartments 10-1a, 10-1b, respectively. Of course, if desired the forward and aft fuel tank systems 100, 200 respectively, may be more permanently mounted to the aircraft fuselage structure.

The forward and aft fuel tank systems 100, 200, respectively, are operably interconnected to the aircraft's on-board fuel system FS including, for example, the main aircraft fuel tank system 10-6 (e.g., the aircraft's wing fuel tanks and their associated pumps, conduits, level sensors and the like) and the fuel management system (FMS) 10-7 (e.g., the cockpit mounted fuel management instruments, monitors and/or controllers operably coupled to the main aircraft fuel tank system). Interconnection to the on-board fuel and fuel management systems 10-6, 10-7 thus allows the fuel contained within the forward and aft tank systems 100, 200, respectively, to be monitored and transferred to the aircraft's main fuel tanks as may be appropriate during the flight to ensure that an adequate supply of fuel is provided to the engines 10-3.

Accompanying FIGS. 2-6 depict in greater detail the structural components of the forward tank system 100. As shown therein, the tank system 100 comprises a series of adjacently mounted tanks 102 forming a tank row generally extending along the longitudinal axis of the aircraft 10. The tanks 102 are depicted in dashed line in the accompanying drawing FIGS. 2-6 for the purpose of enhancing visibility of the various tank components to be discussed in greater detail below. It will also be observed that a few of tanks 102 in the forward tank system 100 are of lesser internal volume (identified in FIG. 2 as the tanks in the series 100a) as compared to the remainder of the tanks 102 rearwardly thereof (identified in FIG. 2 as the tanks in the series 100b). Such a size (and hence internal fuel capacity) difference is to allow the tanks to be positioned within the cargo hold adjacent to other aircraft structures and components (e.g., the retracted nose gear) while yet maximizing the available fuel capacity provided by the forward tank system 100. Thus, it will be understood that the particular size and/or shape of the individual tanks employed in either the forward or aft tank systems 100, 200, respectively, is not critical. As such, virtually any size and/or shape of tank may be provided to be accommodated within a variety of aircraft fuselages. As will be understood from the following discussion, therefore, even though one or more of the individual tanks within the forward and/or aft tank systems 100, 200, respectively, may have a different size and/or shape, they will nonetheless possess similar structural subassemblies and functional attributes.

Figure 3:
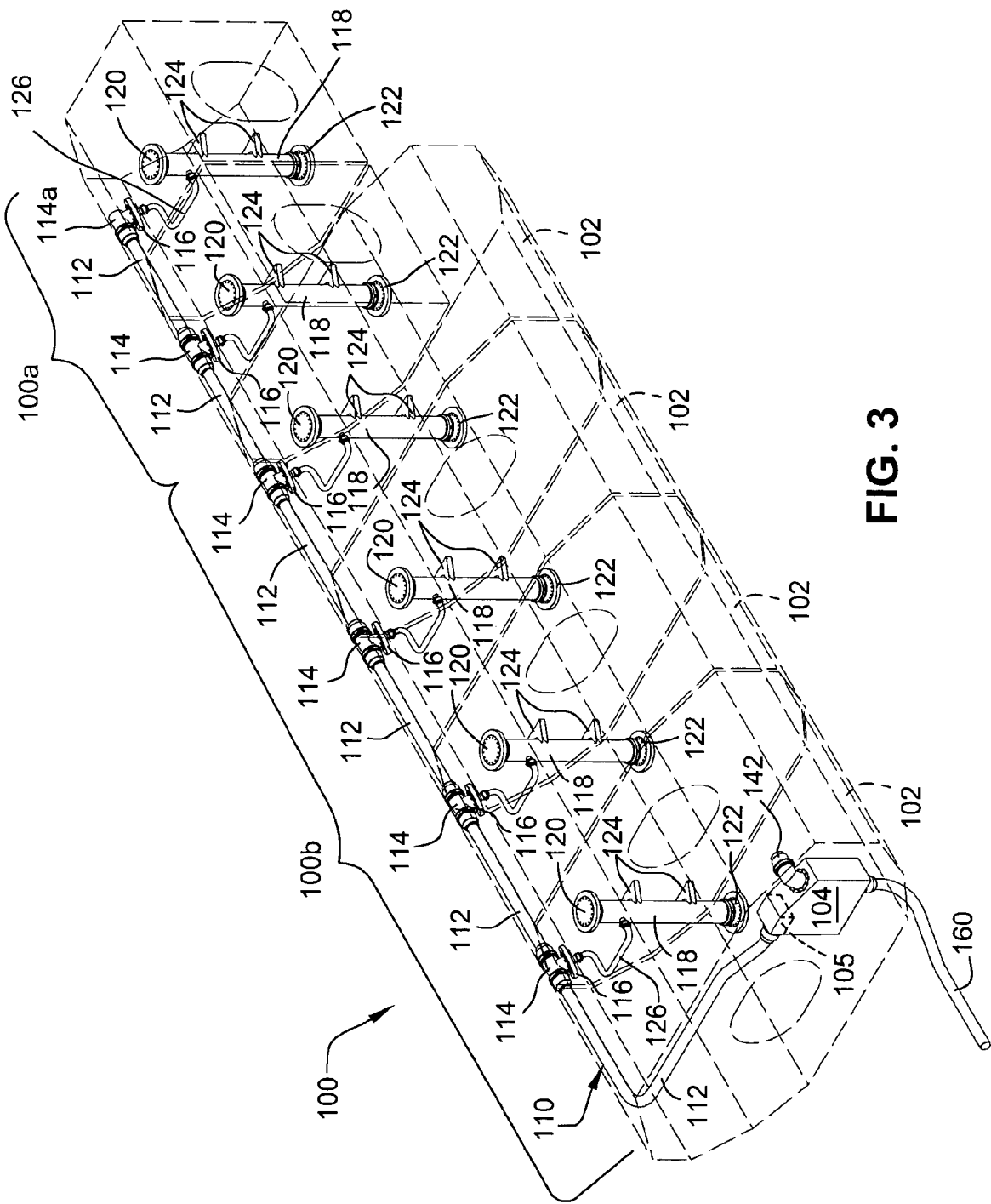
FIG. 3 is a schematic top perspective view of the forward fuselage fuel tank system shown in FIG. 2, but showing only the tank relief manifold assembly thereof for ease of depiction and description.
Figure 4:
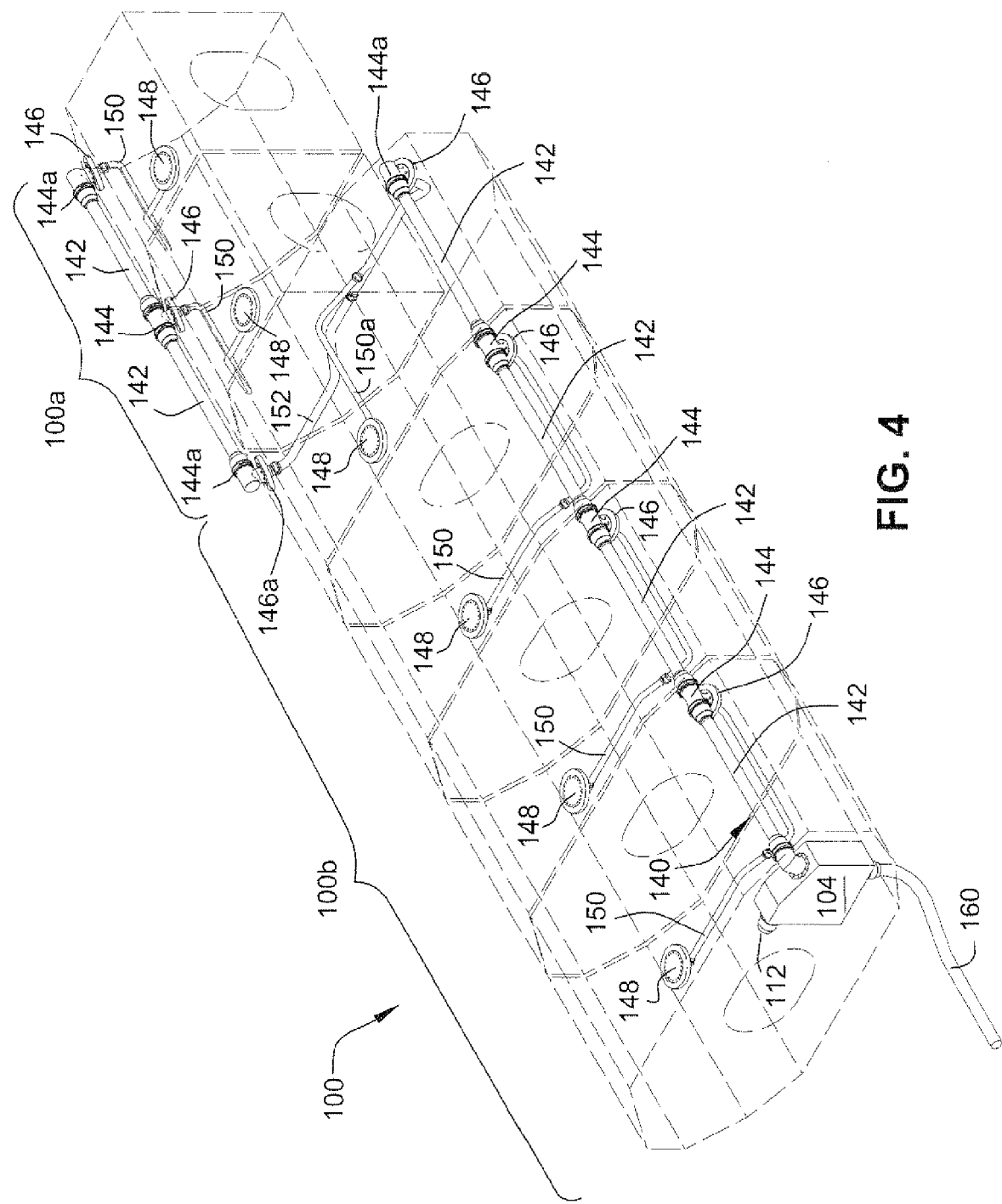
FIG. 4 is a schematic top perspective view of the forward fuselage fuel tank system shown in FIG. 2, but showing only the tank vent manifold assembly thereof for ease of depiction and description.
Figure 5:
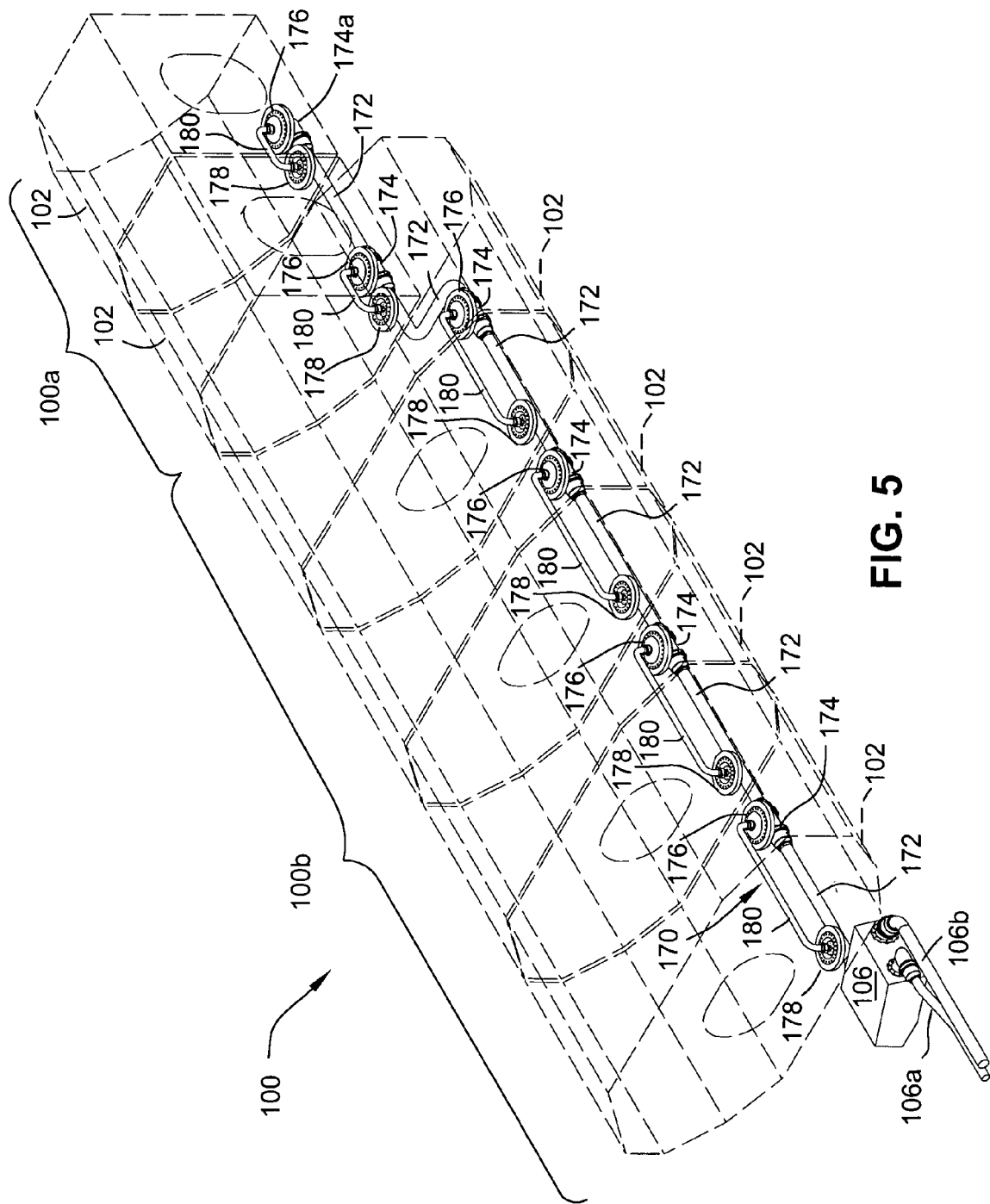
FIG. 5 is a schematic top perspective view of the forward fuselage fuel tank system shown in FIG. 2, but showing only the fuel inlet/transfer manifold assembly thereof for ease of depiction and description.
Figure 6:
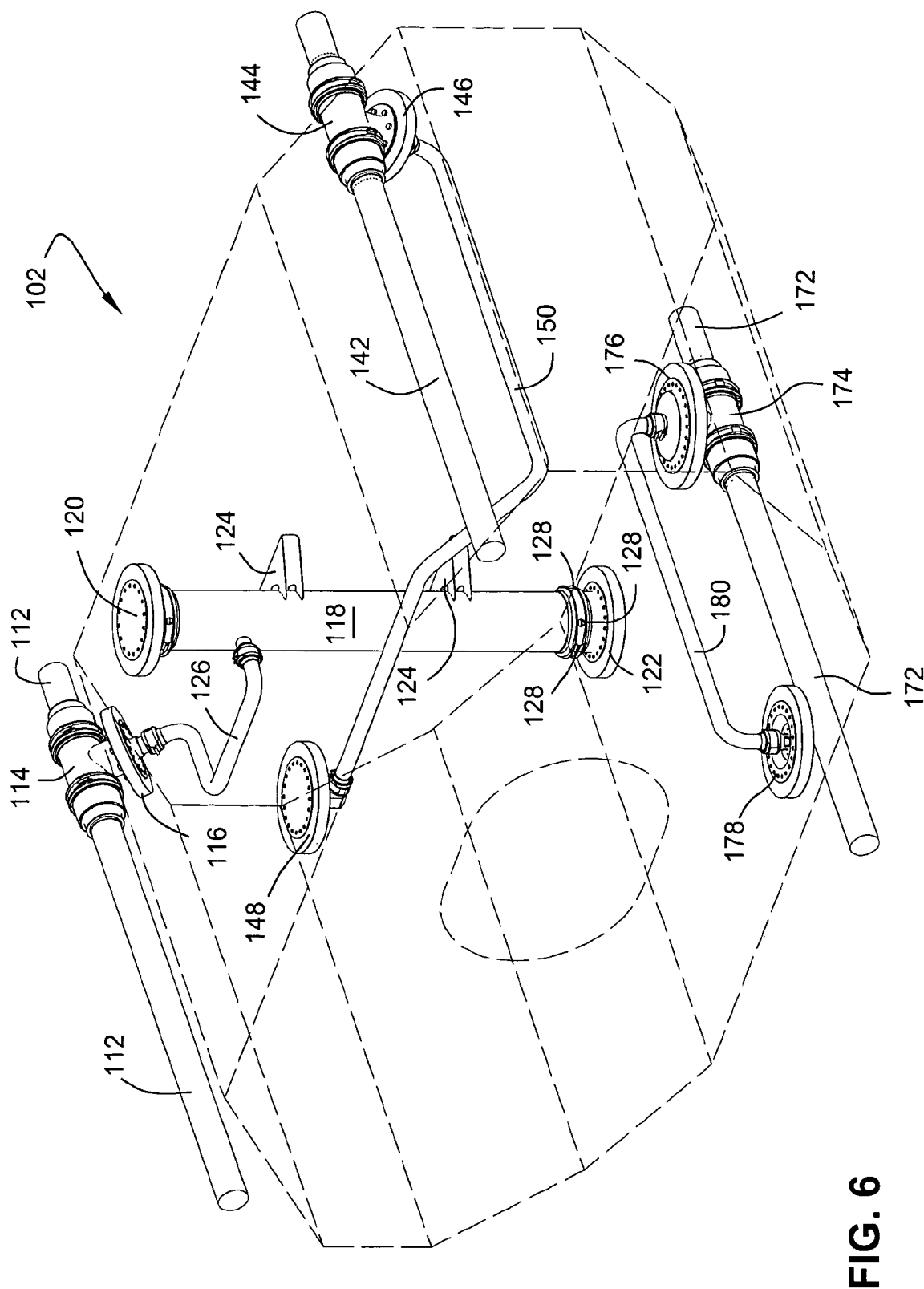
FIG. 6 is an enlarged perspective view of an exemplary one of tank assemblies forming a component part of the forward fuselage fuel tank system shown in FIG. 2.

In general, the tanks 102 are provided with a relief manifold assembly 110, a vent manifold assembly 140 and a refuel/transfer manifold assembly 170 which are individually shown for ease of presentation in accompanying FIGS. 3-5, respectively.

FIG. 3 shows the relief manifold assembly 110. As depicted, the relief manifold 110 includes a relief conduit 112 adjacent an exterior side wall of the tanks 102 which terminates at a relief and vent control box 104. A series of T-couplings 114 fluid-connect the relief conduit 112 to respective access ports 116 provided on adjacent side walls of the tanks 102. It will be observed that the relief conduit 112 terminates at the forward most one of the tanks 102 with an L-coupling 114a since no additional tanks 102 forwardly thereof are provided. Of course, if a particular aircraft would accommodate more tanks 102, then the forward most coupling 114a could be replaced by a T-coupling 114 so as to extend the run of relief conduit 112 in a manner similar to that as shown and discussed above.

Individual buffer vessels 118 defining respective internal buffer chambers are provided in the internal space of each of the tanks 102 and extend between normally closed upper and lower access ports 120, 122 on upper and lower walls of the tanks 102, respectively. The buffer vessels 118 are maintained in a rigidly fixed upright position within the interiors of the tanks 102 by means of vertically spaced apart support collars 124 welded to the interior of a forward wall of each tank 102. Each buffer vessel 118 is fluid-connected to a respective one of the access ports 116, and hence to the relief conduit 112, by branch relief conduit 126. As is perhaps more clearly depicted in accompanying FIG. 6, the buffer vessels 118 are provided with a circumferentially spaced-apart series of apertures 128 which communicate with the interior space of the tanks 102 near the lower access port 122 thereof.

The vent manifold assembly 140 is shown in accompanying FIG. 4. The vent manifold assembly 140 provides a vent between the interior of each of the tanks 102 and ambient conditions exterior to the tanks 102 to prevent hydraulic lock and thereby permit the fuel to flow freely into and out of the same. In this regard, the vent manifold 140 includes a vent conduit 142 adjacent an exterior side wall of the tanks 102 which terminates at the relief and vent control box 104. The aft most series of tanks 102 are provided with T-couplings 144 which fluid-connect the vent conduit 142 to respective vent access ports 146 provided on the tank side walls adjacent the vent conduit 142. The tanks 102 also have a normally closed vent access port 148 on an upper wall thereof which forms an interior pocket recess to which one end of a vent branch line 150 is attached. The other end of the vent branch line 150 is fluid connected to access port 146 and hence is fluid connected to the vent conduit 142. The end of the vent branch line 150 connected to the access port 148 is apertured so as to establish fluid communication between the interior of the tank 102 and the vent conduit 142.

It will be noted that the forward most larger capacity tank 102 includes a first access port 146 on one side wall and a second access port 146a on an opposite side wall with corresponding L-couplings 144a which interconnect the access ports 146, 146a with a respective adjacent exterior run of vent conduit 142. A vent lateral conduit 152 is thus provided on the interior of such tank 102 so as to fluid connect the access ports 146 and 146a (and hence fluid-connect their respective runs of vent conduit 142). A vent branch conduit 150a is therefore fluid connected between the access port 148 thereof and the vent lateral conduit 152. As can be appreciated, such a structural arrangement allows for the vent conduit 142 adjacent the forward most smaller capacity tanks 102 to be positioned within the cargo compartment 10-1a clear of any internal aircraft structures and/or components while still maintaining fluid communication with the control box 104. The vent conduit 142 of course terminates at the forward most one of the tanks 102 with an L-coupling 144a since no additional tanks 102 forwardly thereof are provided. Of course, if a particular aircraft would accommodate more tanks 102, then the forward most coupling 144a could be replaced by a T-coupling 144 so as to extend the run of vent conduit 142 in a manner similar to that as shown and discussed above.

The relief and vent manifolds 110, 140 are fluid connected via control box 104 to a common relief/vent conduit 160. The common relief/vent conduit 160 may in turn be fluid-connected to a similar relief/vent control box associated with the aft tank system 200 and/or to the aircraft's primary fuel relief/vent system (not shown) to vent the tanks 102 to ambient exterior conditions. Within the control box 104 is also provided a one-way pressure relief valve (shown schematically in FIG. 3 by dashed line 105) which receives the terminal end of the relief conduit 112 for a purpose to be described in greater detail below. On the other hand, the relief vent conduit 112 is preferably directly fluid-connected to the conduit 160 (i.e., without an intervening one-way pressure relief valve).

The refuel/transfer manifold assembly 170 is shown in accompanying FIG. 5 and allows fuel to be introduced into each of the tanks 102 and/or transferred from the tanks 102 to the main aircraft wing tanks (not shown) to provide fuel to the engines 10-3 and/or to transfer fuel between tank systems (e.g., to transfer fuel between the forward tank system 100 to the aft tank system 200). The refuel/transfer manifold assembly 170 generally includes a refuel/transfer conduit 172 positioned adjacent an exterior bottom wall of the tanks 102 and terminates at a refuel/transfer control box 106. A series of T-couplings 174 fluid-connect the refuel/transfer conduit 172 to respective access ports 176 provided on adjacent bottom walls of the tanks 102. It will be observed that the refuel/transfer conduit 172 terminates at the forward most one of the tanks 102 with an L-coupling 174a since no additional tanks 102 forwardly thereof are provided. Of course, if a particular aircraft would accommodate more tanks 102, then the forward most coupling 174a could be replaced by a T-coupling 174 so as to extend the run of the refuel/transfer conduit 172 in a manner similar to that as shown and discussed above.

The tanks 102 also have a normally closed access port 178 on a bottom wall thereof which forms an interior recess to which an apertured end of a refuel/transfer branch line 180 is attached. The opposite end of the refuel/transfer branch line 180 is fluid-connected to the refuel/transfer conduit 172 at the access port 176. As noted above, the end of the refuel/transfer branch line 180 which is connected to the access port 178 is apertured so as to establish fluid communication between the interior of the tank 102 and the refuel/transfer conduit 172.

The refuel/transfer control box 106 is provided with a refuel conduit 106a and a transfer conduit 106b for respectively introducing fuel into and withdrawing fuel from the interior of the tanks 102 via the refuel/transfer manifold 170 described above. Within the control box 106 are the necessary components (e.g., fuel pumps, control valves, fluid flow sensors and the like) which are operably connected, e.g., to the aircraft's on-board fuel system FS, by signal lines routed exteriorly of the tanks 102. Thus, an operator during a tank filling operation may command the valves and/or pumps (not shown) within the control box 106 to appropriately open and close via the FMS 10-7 to allow fuel to be introduced via the refuel conduit 106a into the tanks 102 via the refuel/transfer manifold assembly 170. Alternatively, the operator may command the valves and/or pumps within the control box 106 during a fuel transfer operation to allow fuel to be withdrawn from the tanks 102 via the refuel/transfer manifold assembly 170 and the transfer conduit 160b and into the aircraft's main tanks and/or to others of the tanks in the tank systems 100, 200 as may be desired (e.g., so as to maintain proper loading within the aircraft's center of gravity envelope).

In operation, when the tanks 102 are being filled, the fuel introduced by the refuel/transfer manifold 170 as described above, will initially reach a level where the fuel covers the apertures 122 formed at the lower end of the buffer vessels 118. Since the relief manifold assembly 110 is essentially "closed" at this time—i.e., by virtue of the normally closed one-way valve 105 at one end of the conduit 112 within the control box 104, and the forwardmost buffer chamber 118 whose apertures 122 are covered by fuel at the opposite end of the conduit 112—the air within the conduit 112 and the buffer vessels 118 will become somewhat pressurized as compared to the pressure existing within interior space of the tanks 102 (which interior space is vented to the relatively lower pressure ambient atmosphere by virtue of the vent manifold assembly 140). As fuel continues to be introduced into the interior volume of the tanks 102, there will remain a column of somewhat pressurized air present within each of the chambers defined by the buffer vessels 118.

The functions attributable to the relief manifold assembly 110 therefore prevent an overpressure condition occurring which would damage the tank walls and/or components thereby potentially causing fuel leakage. Specifically, where the flight attitude of the aircraft 10 causes fuel from one or more other tanks to flow into another tank causing it to become more full of fuel than may be desired, the air within the buffer vessel 118 will become further pressurized until the set point limit of the one-way valve 105 is reached (which set point is determined, for example, by the maximum air pressure existing within the buffer vessel at a time when the maximum permissible volume of fuel within the tank 102 has been reached). Once the pressure set point limit of the one-way valve 105 is exceeded (i.e., by additional fuel being introduced into the tank 102), the one-way valve 105 will open to allow air trapped within the buffer vessel 118 to escape (vented overboard) which in turn allows some fuel to enter the internal volume space defined by the buffer vessel 118. This "filling" of the buffer chamber defined by the buffer vessel 118 will thereafter continue from time to time as needed until the fuel fully occupies the internal volume of the buffer chamber defined by the buffer vessel 118 at which time it will be directed overboard by means of the relief manifold assembly 110. The risk of the buffer vessels 118 becoming completely filled during normal aircraft operations is, however, quite low. The interior volume space within the buffer vessels 118 should thus be sufficient to provide adequate protection against overpressure due to inter-tank fuel transfers while yet allowing the fuel to remain ready for use within the tank system 100. As a worst case, therefore, the tanks 102 will be protected against overpressure by allowing fuel to be "dumped" in the rare event that the complete internal chamber volume of a tank's buffer vessel 118 becomes filled with excess fuel.

The aft tank system 200 is generally quite similar structurally and functionally as compared to the tank system 100 described above. Thus, structures depicted in accompanying FIGS. 7-11 associated with the aft tank system 200 have similar reference numerals as compared to the structures of the forward tank system 100, except that the reference numerals for the former are in a "200" series of numbers whereas the reference numerals for the latter are in a "100" series of numbers.

It will be observed that the aft tank system 200 includes a series 200a of larger capacity tanks 202 and a series of smaller capacity tanks 202 arranged longitudinally adjacent one another generally along the longitudinal axis of the aircraft 10. A space 200c may exist between the series 200a and 200b so as to accommodate the control boxes 203 and 206 associated operatively with the fuel vent and refuel/transfer manifolds 240 and 270, respectively. The control box 204 dedicated to the relief manifold assembly 210 is most preferably positioned forwardly of the forwardmost one of the tanks 202 in the series 200a.

Figure 7:
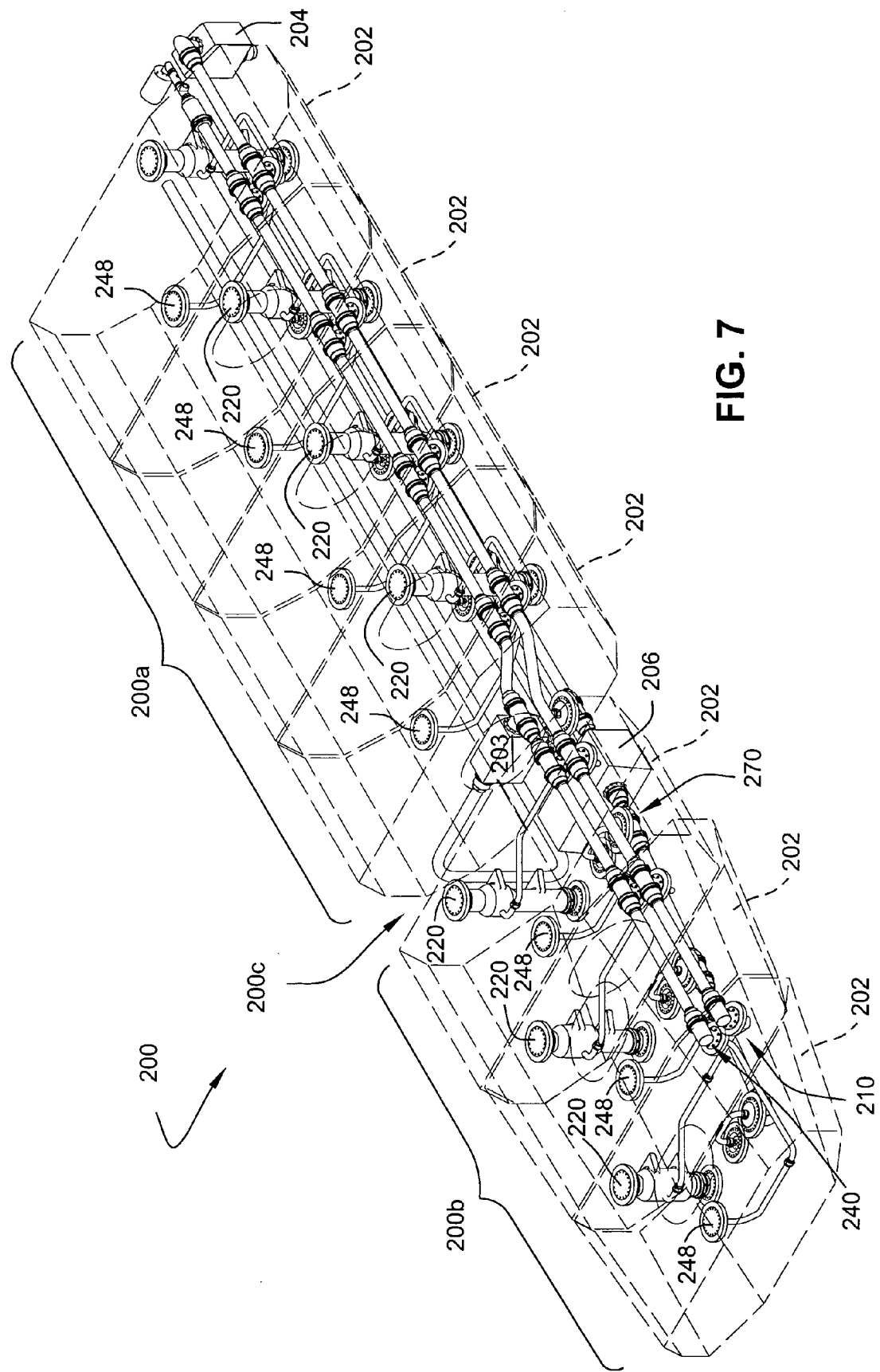
FIG. 7 is a schematic top perspective view of the aft fuselage fuel tank system shown in FIG. 1.

It will also be observed from FIG. 7 that the layout and/or arrangement of conduits and associated structures for the aft tank system 200 is somewhat different as compared to the forward tank system 100. Thus, for example, the conduits 212 and couplings 214 (214a) of the relief manifold assembly 210 are positioned closely adjacent to and generally parallel with the conduit 242 and couplings 244 (244a) associated with the vent manifold assembly 240 along common (not opposed) sides of the tanks 202.

Figure 8:
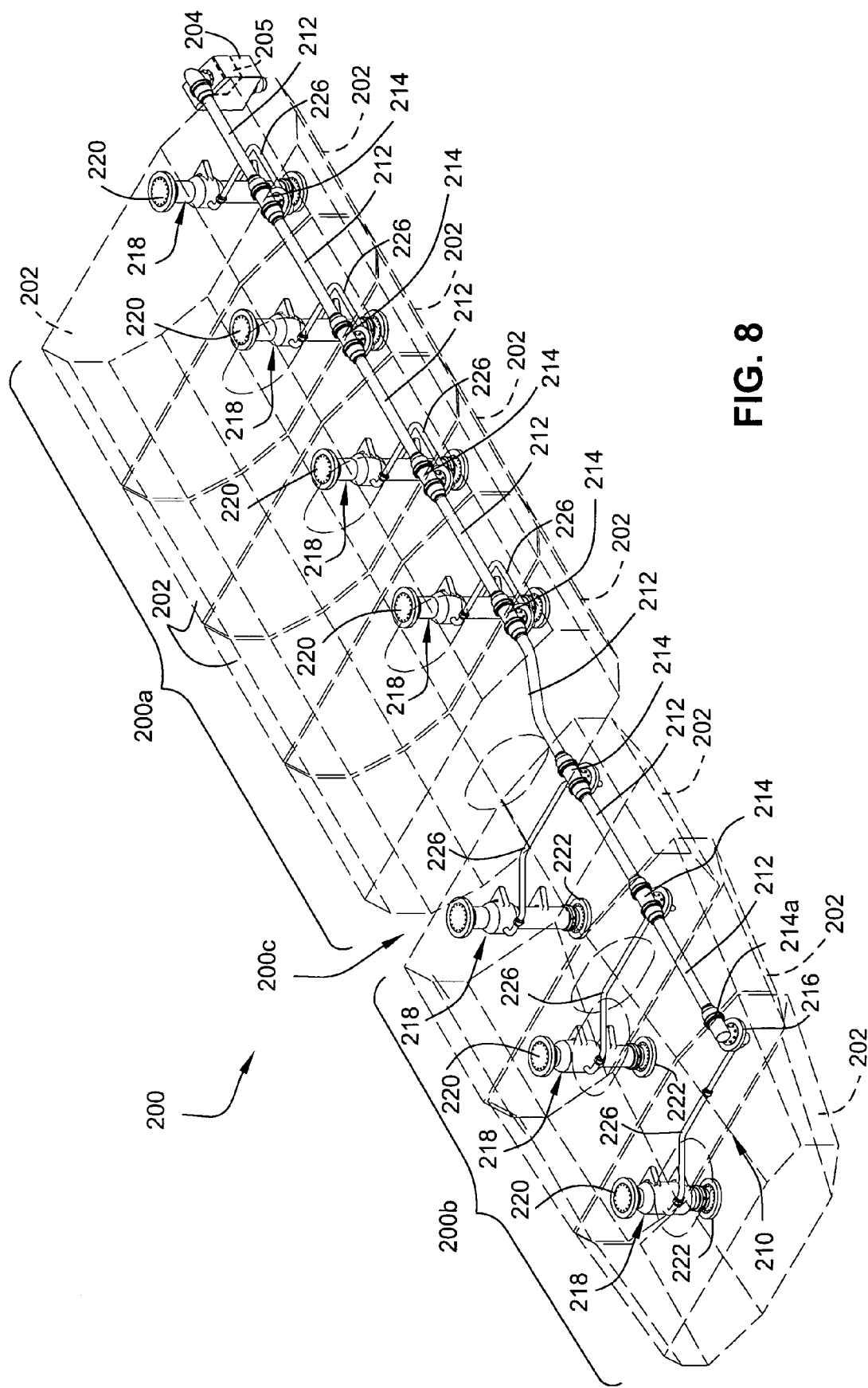
FIG. 8 is a schematic top perspective view of the aft fuselage fuel tank system shown in FIG. 7, but showing only the tank relief manifold assembly thereof for ease of depiction and description.

As shown perhaps more clearly in accompanying FIG. 8, the relief manifold assembly 210 is comprised generally of a relief conduit 212 which terminates at a relief control box 204. A series of T-couplings 214 fluid-connect the relief conduit 212 to respective access ports 216 provided on adjacent side walls of the tanks 202. It will be observed that the relief conduit 212 terminates at the rearward most one of the tanks 202 with an L-coupling 214a since no additional tanks 202 rearwardly thereof are provided. Of course, if a particular aircraft would accommodate more tanks 202, then the rearward most coupling 214a could be replaced by a T-coupling 214 so as to extend the run of relief conduit 212 in a manner similar to that as shown and discussed above.

Individual buffer vessels 218 defining buffer chambers are provided in the internal space of each of the tanks 202 and extend between normally closed upper and lower access ports 220, 222 on upper and lower walls of the tanks 202, respectively. The buffer vessels 218 are maintained in a rigidly fixed upright position within the interiors of the tanks 202 by means of vertically spaced apart support collars 224 welded to the interior of a forward wall of each tank 202. Each buffer vessel 218 includes an annular section 218a thereof which is fluid-connected to a respective one of the access ports 216, and hence to the relief conduit 212, by branch relief conduit 226. The annular section 218a is provided so as to increase the volume of the associated buffer vessel 218 and to provide a maximum fill region for the associated tank 202. As is perhaps more clearly depicted in accompanying FIG. 11, the buffer vessels 218 are provided with a circumferentially spaced-apart series of apertures 228 which communicate with the interior space of the tanks 202 near the lower access port 222 thereof.

Figure 9:
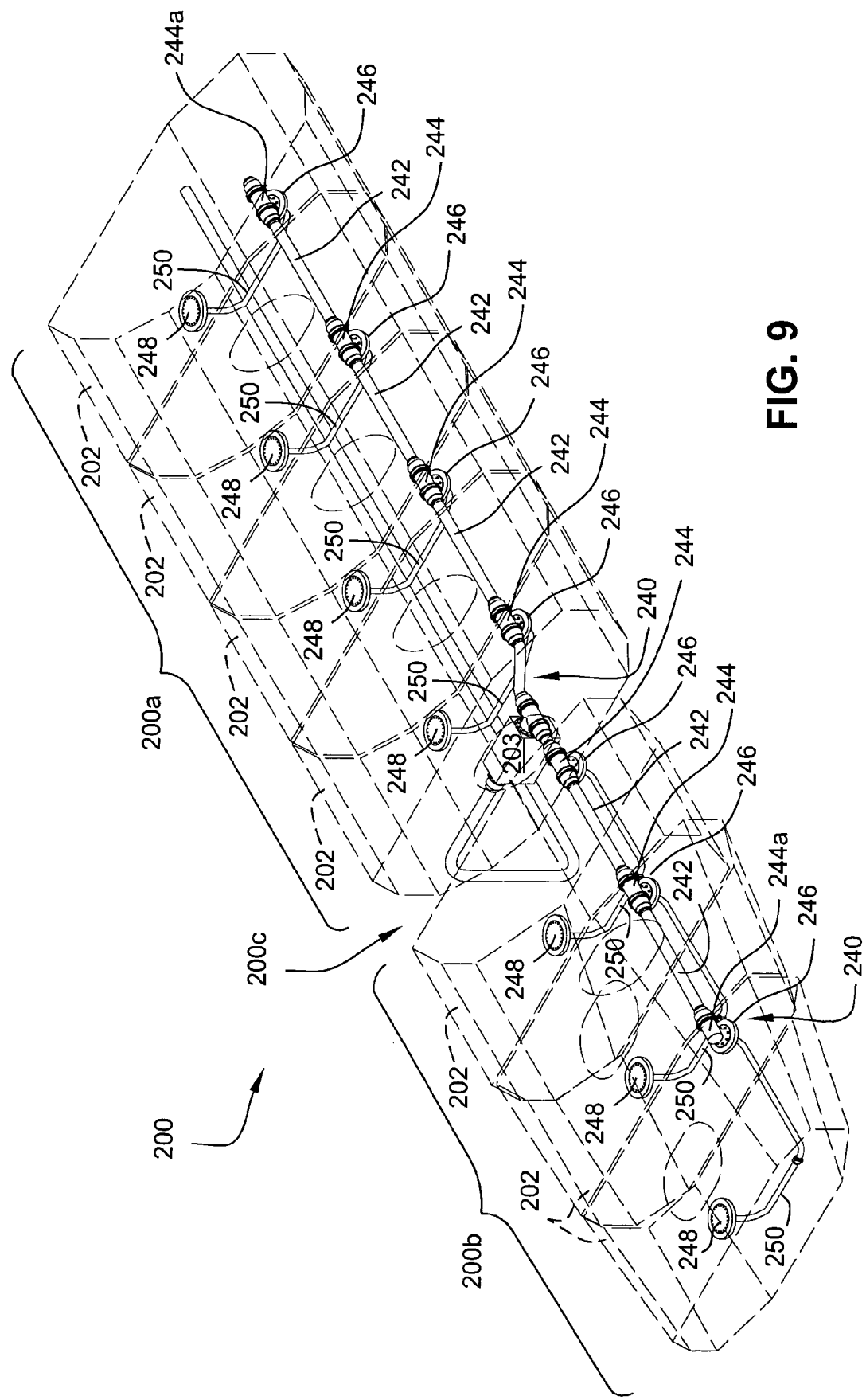
FIG. 9 is a schematic top perspective view of the aft fuselage fuel tank system shown in FIG. 7, but showing only the tank vent manifold assembly thereof for ease of depiction and description.

The vent manifold assembly 240 is shown in accompanying FIG. 9. The vent manifold assembly 240 provides a vent between the interior of each of the tanks 202 and ambient conditions exterior to the tanks 202 to prevent hydraulic lock and thereby permit the fuel to flow freely into and out of the same. In this regard, the vent manifold 240 includes a vent conduit 242 adjacent an exterior side wall of the tanks 202 which terminates at the vent control box 203. Most of the tanks 202 are provided with T-couplings 244 which fluid-connect the vent conduit 242 to respective vent access ports 246 provided on the tank side walls adjacent the vent conduit 242. The tanks 202 also have a normally closed vent access port 248 on an upper wall thereof which forms an interior pocket recess to which one end of a vent branch line 250 is attached. The other end of the vent branch line 250 is fluid connected to access port 246 and hence is fluid connected to the vent conduit 242. The end of the vent branch line 250 connected to the access port 248 is apertured so as to establish fluid communication between the interior of the tank 202 and the vent conduit 242.

It will be noted that the rearwardmost tank 202 is provided with an L-shaped coupling 244a since it is the last tank in the series of tanks 202 of the aft tank system 200. In addition, although a T-shaped coupling is shown being provided with the forwardmost tank 202 in the aft tank system 200, it will be appreciated that it has a closed end thereby effectively making it a L-shaped coupling 244a.

Figure 10:
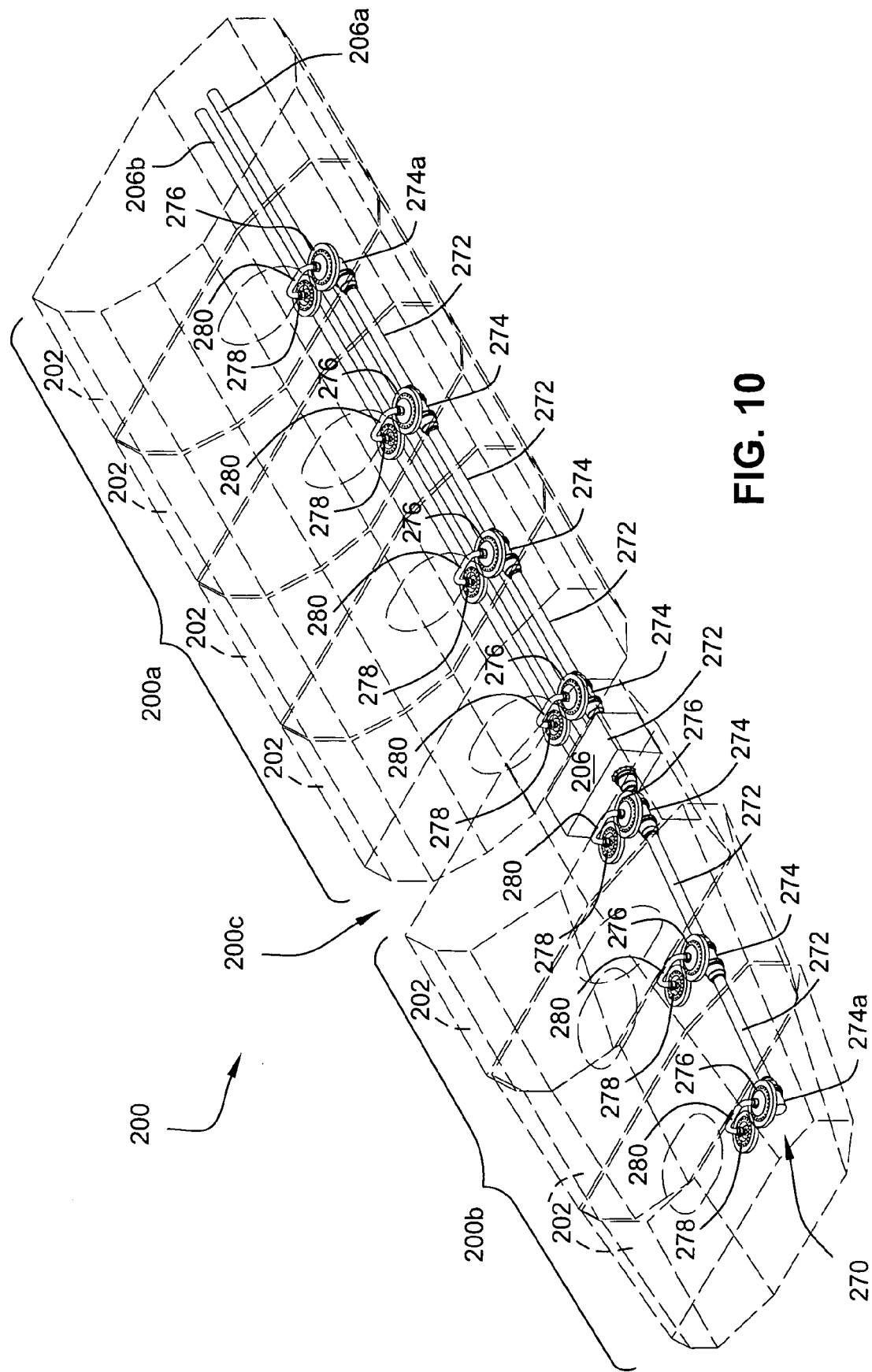
FIG. 10 is a schematic top perspective view of the aft fuselage fuel tank system shown in FIG. 7, but showing only the fuel inlet/transfer manifold assembly thereof for ease of depiction and description.

The refuel/transfer manifold assembly 270 is shown in accompanying FIG. 10 and allows fuel to be introduced into each of the tanks 202 and/or transferred from the tanks 202 to the main aircraft wing tanks (not shown) to provide fuel to the engines 10-3 and/or to transfer fuel between tank systems (e.g., to transfer fuel between the forward tank system 100 to the aft tank system 200). The refuel/transfer manifold assembly 270 generally includes a refuel/transfer conduit 272 positioned adjacent an exterior bottom wall of the tanks 202 which is fluid-connected to a refuel/transfer control box 206 located in the space 200c. A series of T-couplings 274 fluid-connect the refuel/transfer conduit 272 to respective access port 276 provided on adjacent bottom walls of the tanks 202. It will be observed that the conduit 272 terminates at the forward most and rearwardmost ones of the tanks 202 with an L-coupling 274a since no additional tanks 202 forwardly and rearwardly thereof are provided. Of course, if a particular aircraft would accommodate more tanks 202, then the couplings 274a could be replaced by T-couplings 274 so as to extend the run of the refuel/transfer conduit 272 in a manner similar to that as shown and discussed above.

The tanks 202 also have a normally closed access port 278 on a bottom wall thereof which forms an interior recess to which an apertured end of a refuel/transfer branch line 280 is attached. The opposite end of the refuel/transfer branch line 280 is fluid-connected to the refuel/transfer conduit 272 at the access port 276. As noted above, the end of the refuel/transfer branch line 280 which is connected to the access port 278 is apertured so as to establish fluid communication between the interior of the tank 202 and the refuel/transfer conduit 272.

The refuel/transfer control box 206 is provided with a refuel conduit 206a and a transfer conduit 106b for respectively introducing fuel into and withdrawing fuel from the interior of the tanks 202 via the refuel/transfer manifold 270 described above. Within the control box 206 are the necessary components (e.g., fuel pumps, control valves, fluid flow sensors and the like) which are operably connected, e.g., to the aircraft's on-board fuel system FS, by signal lines routed exteriorly of the tanks 202. Thus, an operator during a tank filling operation may command the valves and/or pumps (not shown) within the control box 206 to appropriately open and close via the FMS 10-7 to allow fuel to be introduced via the refuel conduit 106a into the tanks 202 via the refuel/transfer manifold assembly 270. Alternatively, the operator may command the valves and/or pumps within the control box 206 during a fuel transfer operation to allow fuel to be withdrawn from the tanks 202 via the refuel/transfer manifold assembly 270 and the transfer conduit 206b and into the aircraft's main tanks and/or to others of the tanks in the tank systems 100, 200 as may be desired (e.g., so as to maintain proper loading within the aircraft's center of gravity envelope).

In operation, when the tanks 202 are being filled, the fuel introduced by the refuel/transfer manifold 270 as described above, will initially reach a level where the fuel covers the apertures 222 formed at the lower end of the buffer vessels 218. Since the relief manifold assembly 210 is essentially "closed" at this time—i.e., by virtue of the normally closed one-way valve 205 at one end of the conduit 212 within the control box 204 (see FIG. 8), and the rearwardmost buffer vessel 218 whose apertures 222 are covered by fuel at the opposite end of the conduit 212—the air within the conduit 212 and the buffer vessels 218 will become somewhat pressurized as compared to the interior space of the tanks 202 (which interior space is vented to the relatively lower pressure ambient atmosphere by virtue of the vent manifold assembly 240). As fuel continues to be introduced into the interior volume of the tanks 202, there will remain a column of somewhat pressurized air present within each of the buffer vessels 218.

The functions attributable to the relief manifold assembly 210 therefore prevent an overpressure condition occurring which would damage the tank walls and/or components thereby potentially causing fuel leakage. Specifically, where the flight attitude of the aircraft 10 causes fuel from one or more other tanks to flow into another tank causing it to become more full of fuel than may be desired, the air within the buffer vessel will become further pressurized until the set point limit of the one-way valve 205 is reached (which set point is determined, for example, by the maximum air pressure existing within the buffer chamber of the buffer vessel 218 at a time when the maximum permissible volume of fuel within the tank 202 has been reached). Once the pressure set point limit of the one-way valve 205 is exceeded (i.e., by additional fuel being introduced into the tank 202), the one-way valve 205 will open to allow air trapped within the buffer vessel 218 to escape (vented overboard) which in turn allows some fuel to enter the internal volume of the buffer chamber defined by the buffer vessel 218. This "filling" of the buffer chamber defined by the buffer vessel 218 will thereafter continue as needed until the fuel fully occupies the buffer vessel 218 at which time it will be directed overboard by means of the relief manifold assembly 210. The risk of the buffer vessels 218 becoming completely filled during normal aircraft operations is, however, quite low. The interior volume space within the buffer vessels 218 should therefore be sufficient to provide adequate protection against overpressure due to inter-tank fuel transfers while yet allowing the fuel to remain ready for use within the tank system 200. As a worst case, therefore, the tanks 202 will be protected against overpressure by allowing fuel to be "dumped" in the rare event that the complete internal chamber volume of a tank's buffer vessel 218 becomes filled with excess fuel.

The buffer vessels 118 and/or 218 do not need to be cylindrically cross-sectionally shaped tubular elements as shown, but could be formed of other geometric configurations. In addition, while the preferred embodiments of this invention described above contemplate that the buffer vessels 118 and/or 218 are provided as tank-internal components, it is entirely conceivable that such structures and their attendant functions could be provided as tank-external structures in those situations where the internal aircraft space and/or configuration demands such an alternative. In the event that one or more of the buffer vessels 118 and/or 218 are embodied as tank-external structures, then a suitable branch conduit internally within the tank and having an apertured end near the bottom tank wall would need to be provided and fluid-connected to a respective tank-external buffer vessel via an appropriate tank access port.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:
1. An aircraft fuel tank comprising:
a tank body having upper, lower and side walls which define an interior space for holding a maximum allowable volume of aircraft fuel, and a relief manifold assembly operatively mounted internally within the tank body to prevent an overpressure condition in the interior space of the fuel tank body due to an excess volume of fuel being introduced thereinto which exceeds the maximum allowable volume of fuel, wherein the relief manifold assembly includes, a buffer vessel which defines an internal buffer chamber within the tank body extending upright between the upper and lower walls of the tank body, the buffer vessel including an aperture located at a lower end thereof near the lower wall of the tank body and exposed directly to the fuel held in the interior space of the tank body, and a relief branch conduit which fluid connects the buffer chamber to a relief conduit and an associated pressure relief valve positioned externally of the tank body, the pressure relief valve having a pressure set point corresponding to the maximum allowable volume of aircraft fuel within the interior space of the tank body, wherein the aircraft fuel held in the interior space of the tank body covers the aperture of the buffer chamber so as to establish an air column under a pressure condition which increases in response to an increase of fuel volume within the interior space of the tank body, and wherein the air column achieves a maximum pressure condition corresponding to the maximum allowable fuel volume within the interior space of the tank body as determined by the pressure set point of the pressure relief valve so that additional fuel introduced into the interior space of the tank body which exceeds the maximum allowable volume of fuel will cause the pressure relief valve to operate and thereby vent the air column through the relief conduit which in turn allows a portion of the fuel held in the interior space of the tank body to enter the buffer chamber so as to relieve the maximum pressure condition of the air column therewithin and thereby prevent an overpressure condition within the interior space of the tank body.

2. The aircraft fuel tank as in claim 1, wherein the buffer vessel is fixed to the upper and lower walls of the tank body within the interior space thereof.

3. The aircraft fuel tank as in claim 1, wherein the buffer vessel includes a plurality of spaced-apart apertures at the lower end thereof.

4. The aircraft fuel tank as in claim 1, further comprising at least one of a fuel vent manifold assembly for venting the interior space of the fuel tank and a fuel refill/transfer manifold assembly for supplying fuel to and withdrawing fuel from the interior space of the fuel tank.

5. The aircraft fuel tank as in claim 1, further comprising a fuel refill/transfer manifold assembly, the refill/transfer manifold assembly comprising:

a refill/transfer conduit positioned external to the tank body, a refill/transfer access port on a wall of the tank body to allow access therethrough to the interior spaced defined thereby, an internal recess located on a bottom wall of the tank body within the interior space defined thereby, and a refill/transfer branch line positioned within the interior space of the tank body and establishing fluid communication between the internal recess and the external refill/transfer conduit through the refill/transfer access port.

6. The aircraft fuel tank as in claim 1 or 5, further comprising a vent manifold assembly, the vent manifold assembly comprising:

a vent conduit positioned external to the tank body, a vent access port on a wall of the tank body to allow access therethrough to the interior spaced defined thereby, an internal recess located on a top wall of the tank body within the interior space defined thereby, and a vent branch line positioned within the interior space of the tank body and establishing fluid communication between the internal recess and the external vent conduit through the vent access port.

7. The aircraft fuel tank as in claim 6, wherein one of the relief manifold assembly, the refill/transfer manifold assembly and the vent manifold assembly is connected to at least one control box positioned external to the tank body.

8. The aircraft fuel tank as in claim 6, wherein each of the relief manifold assembly, and the vent manifold assembly is connected to a common control box positioned external to the tank body.

9. An aircraft fuel tank system comprising a plurality of aircraft fuel tanks as in claim 1 positioned adjacent to one another.

10. The aircraft fuel tank as in claim 1, wherein the buffer chamber is a cylindrical tube which includes a plurality of apertures at a lower end thereof which are circumferentially spaced apart from one another.

11. An aircraft fuel tank system adapted to being mounted within a fuselage section of the aircraft so as to supplement a main fuel system of the aircraft, the fuel tank system comprising:

at least one fuel tank having a tank body which defines an interior space for containing aircraft fuel, the tank body being sized and configured to be positioned within the fuselage section of the aircraft and for containing a maximum allowable volume of aircraft fuel therewithin;

at least one fluid manifold assembly operably coupled to the at least one fuel tank so as to be in fluid communication with the interior space defined thereby; and at least one control box external of the at least one fuel tank and adapted to fluid-connect the at least one fluid manifold assembly to the main fuel system of the aircraft, wherein the at least one fluid manifold assembly comprises a relief manifold assembly operatively associated to the tank body to prevent an overpressure condition within the interior space of the fuel tank body due to an excess volume of fuel being introduced thereinto which exceeds the maximum allowable volume of fuel. and wherein the relief manifold assembly includes, a relief conduit:

a pressure relief valve operatively associated with the relief conduit, the pressure relief valve having a pressure set point corresponding to the maximum allowable volume of aircraft fuel within the interior space of the tank body a buffer vessel which defines an internal buffer chamber within the tank body extending upright between user and lower walls of the tank body, the buffer vessel including an aperture located at a lower end thereof near the lower wall of the tank body and exposed directly to the fuel held in the interior space of the tank body, and a relief branch conduit which fluid connects the buffer chamber to the relief conduit, and wherein the aircraft fuel held in the interior space of the tank body covers the aperture of the buffer chamber so as to establish an air column under a pressure condition which increases in response to an increase of fuel volume within the interior space of the tank body, and wherein the air column achieves a maximum pressure condition corresponding to the maximum allowable fuel volume within the interior space of the tank body as determined by the pressure set point of the pressure relief valve so that additional fuel introduced into the interior space of the tank body which exceeds the maximum allowable volume of fuel will cause the relief valve to operate and thereby vent the air column through the relief conduit which in turn allows a portion of the fuel held in the interior space of the tank body to enter the buffer chamber so as to relieve the maximum pressure condition of the air column therewithin and thereby prevent an overpressure condition within the interior space of the tank body.

12. The aircraft tank system as in claim 11, wherein the at least one fluid manifold assembly further comprises:
a fuel vent manifold assembly for venting the interior space of the fuel tank; and
a fuel refill/transfer manifold assembly for supplying fuel to and withdrawing fuel from the interior space of the fuel tank.

13. The aircraft tank system as in claim 11, wherein the at least one fluid manifold assembly further comprises a fuel refill/transfer manifold assembly for supplying fuel to and withdrawing fuel from the interior space of the fuel tank.

14. The aircraft tank system as in claim 11, which comprises:
a fuel vent manifold assembly for venting the interior space of the fuel tank, and
a fuel refill/transfer manifold assembly for supplying fuel to and withdrawing fuel from the interior space of the fuel tank, and wherein
the at least one control box is operatively connected to at least one of the fuel vent manifold assembly and the fuel refill/transfer manifold assembly.

15. The aircraft tank system as in claim 11, wherein the at least one control box is operatively connected to the relief manifold assembly and includes the pressure relief valve.

16. The aircraft tank system as in claim 11, wherein the buffer vessel is fixed to the of the tank body within the interior space thereof.

17. The aircraft tank system as in claim 11, wherein the buffer vessel includes plural apertures at the lower end.

18. An aircraft having a fuselage compartment and an aircraft fuel tank system as in claim 11 or 9 positioned within the fuselage compartment so as to be disposed generally along a longitudinal axis of the aircraft.

19. An aircraft as in claim 18, wherein the aircraft fuel tank system comprises a forward fuel tank system positioned within a forward section of the fuselage compartment, and an aft fuel tank system positioned within an aft section of the fuselage compartment, wherein each of the forward and aft fuel tank systems comprise a plurality of the aircraft fuel tanks positioned adjacent to one another and disposed generally along a longitudinal axis of the aircraft.

20. The tank system as in claim 11, which further comprises:
a vent manifold assembly for venting the interior space of the at least one tank body,
a refill/transfer manifold assembly for supplying liquid to and withdrawing liquid from the interior space of the at least one tank body, and
at least one control box operatively connected to at least one of the vent manifold assembly and the refill/transfer manifold assembly.

21. A method of providing additional fuel capacity to an aircraft comprising positioning within a fuselage of the aircraft an aircraft fuel tanks as in claim 11.

22. A method of preventing an overpressure condition within auxiliary fuel tanks providing additional fuel capacity for an aircraft comprising:
(a) providing a plurality of aircraft fuel tanks each having a tank body with upper, lower and side walls which define an interior space for containing a maximum allowable volume of aircraft fuel, wherein each of tank bodies includes internal structural components associated with a relief manifold assembly which communicates externally through a wall of the fuel tank body by means of a relief access port, the internal components of the relief manifold assembly include a buffer vessel which defines an internal buffer chamber within the tank body extending upright between the upper and lower walls of the tank body, the buffer vessel including an aperture located at a lower end of the buffer vessel near the lower wall of the tank body and exposed directly to the fuel held in the interior space of the tank body so that the aperture is covered by the fuel contained in the interior space of the tank body so as to establish an air column under a pressure condition which increases in response to an increase of fuel volume within the interior space of the tank body;
(b) sequentially positioning the aircraft fuel tanks within a fuselage compartment of the aircraft so that the plurality of tank bodies are positioned adjacent to one another along a longitudinal axis of the aircraft;
(c) operably connecting the internal structural components of the relief manifold assembly with external structural components thereof by operably fluid-connecting the internal structural components and external structural components through the relief access port, the external structural components comprising a relief conduit and a pressure relief valve operably associated with the relief conduit, the pressure relief valve having a pressure set point corresponding to the maximum allowable volume of aircraft fuel that may be contained within the interior space of the tank body; and
(d) operably connecting the fuel tanks to allow for fuel to be transferred therebetween; and
(e) allowing the air column to achieve a maximum pressure condition corresponding to the maximum allowable fuel volume within the interior space of the tank body as determined by the pressure set point of the pressure relief valve when fuel introduced into the interior space of the tank body exceeds the maximum allowable volume of fuel; and
(f) causing the relief valve to operate in response to the air column achieving the maximum pressure condition to thereby vent the air column through the relief conduit which in turn allows a portion of the fuel in the tank body to enter the buffer chamber so as to relieve the maximum pressure condition of the air column therewithin, whereby an overpressure condition within the interior space of the tank body is prevented.

23. The method of claim 22, wherein step (d) comprises operably connecting the external structural components of relief manifold assembly to a control box which includes the pressure relief valve external to the tank body.

24. The method of claim 23, wherein the control box further comprises at least one of a pump, a valve, and a sensor associated with at least one other manifold assembly selected from the group consisting of a vent manifold assembly and a fuel refill/transfer manifold assembly.

25. The method of claim 22, wherein step (b) comprises positioning a first series of the fuel tanks in a forward fuselage compartment and a second series of the fuel tanks in an aft fuselage compartment of the aircraft.

26. The method of claim 22, which further comprises operably connecting the plurality of aircraft fuel tanks to a respective part of an on-board fuel system of the aircraft to allow the additional fuel capacity provided by the plurality of aircraft fuel tanks to be used an engine of the aircraft.

27. A liquid holding tank system comprising:
  at least one tank body having upper, lower and side walls which define an interior space for holding a maximum allowable volume of liquid therewithin;
  at least one fluid manifold assembly operably coupled to the at least one tank body so as to be in fluid communication with the interior space defined thereby; and
  a relief manifold assembly operatively associated with the at least one tank body to prevent an overpressure condition within the interior space of the tank body due to an excess volume of liquid being introduced thereinto which exceeds the maximum allowable volume of liquid, wherein
  the relief manifold assembly includes,
    a relief conduit;
    a pressure relief valve operatively associated with the relief conduit, the pressure relief valve having a pressure set point corresponding to the maximum allowable volume of liquid within the interior space of the tank body
    a buffer vessel which defines an internal buffer chamber within the tank body extending upright between the upper and lower walls of the tank body, the buffer vessel including an aperture located at a lower end of thereof near the lower wall of the tank body and exposed directly to the liquid held in the interior space of the tank body, and
    a relief branch conduit which fluid connects the buffer chamber to the relief conduit, and wherein
    the liquid held in the interior space of the at least one tank body covers the aperture of the buffer chamber so as to establish an air column under a pressure condition which increases in response to an increase of liquid volume within the interior space of the tank body, and wherein
  the air column achieves a maximum pressure condition corresponding to the maximum allowable liquid volume within the interior space of the tank body as determined by the pressure set point of the pressure relief valve so that additional liquid introduced into the interior space of the tank body which exceeds the maximum allowable volume of liquid will cause the relief valve to operate and thereby vent the air column through the relief conduit which in turn allows a portion of the liquid held in the interior space of the tank body to enter the buffer chamber so as to relieve the maximum pressure condition of the air column therewithin and thereby prevent an overpressure condition within the interior space of the tank body.

28. The tank system as in claim 27, which further comprises:
  a vent manifold assembly for venting the interior space of the at least one tank body; and
  a refill/transfer manifold assembly for supplying liquid to and withdrawing liquid from the interior space of the at least one tank body.

29. The tank system as in claim 27, which further comprises a refill/transfer manifold assembly for supplying liquid to and withdrawing liquid from the interior space of the at least one tank body.

30. The tank system as in claim 27, wherein the buffer vessel is fixed to the upper and lower walls of the at least one tank body within the interior space thereof.

31. The tank system as in claim 27, wherein the buffer vessel includes plural apertures at the lower end thereof.

32. The tank system as in claim 31, wherein the buffer vessel is cylindrical and wherein the plural apertures are circumferentially spaced apart from one another at the lower end thereof.

* * * * *